March 6, 1962  N. W. BOORER  3,023,983
AEROPLANE HAVING WINGS ADJUSTABLE IN SWEEP
Filed Nov. 18, 1960  2 Sheets-Sheet 1
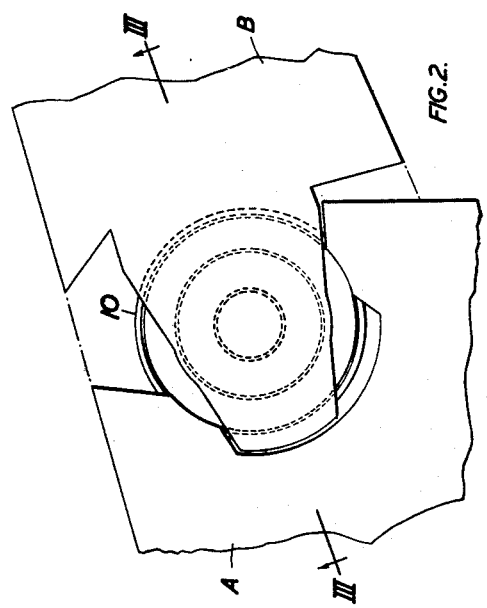
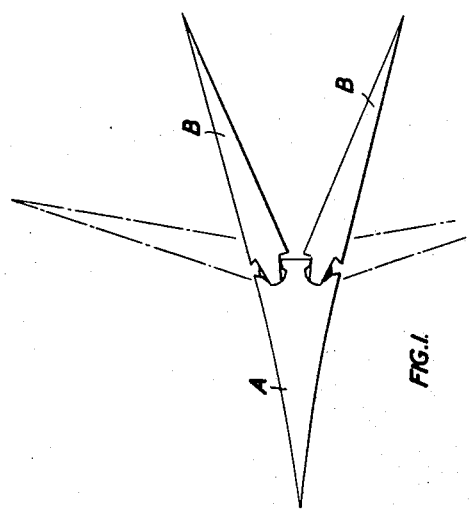
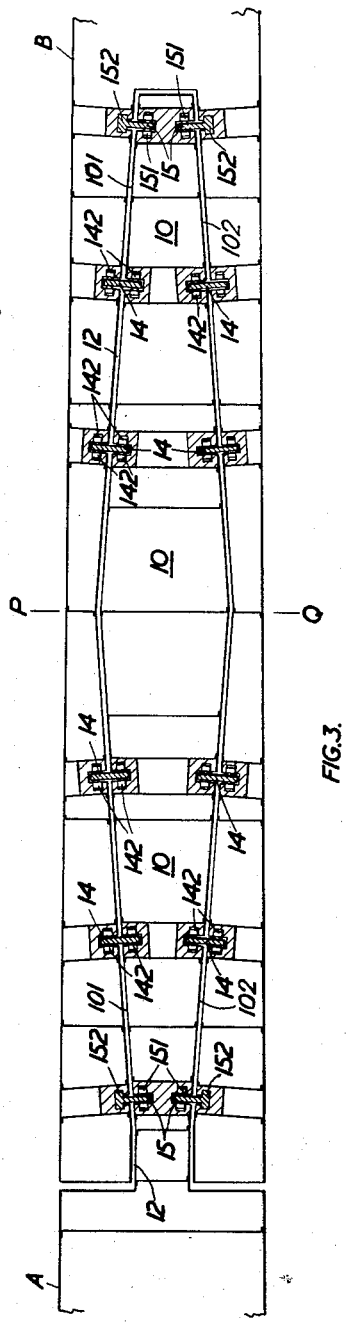
Inventor
Norman William Boorer
By Moses, Nolte & Nolte
Attorneys March 6, 1962 N. W. BOORER 3,023,983
AEROPLANE HAVING WINGS ADJUSTABLE IN SWEEP
Filed Nov. 18, 1960 2 Sheets-Sheet 2
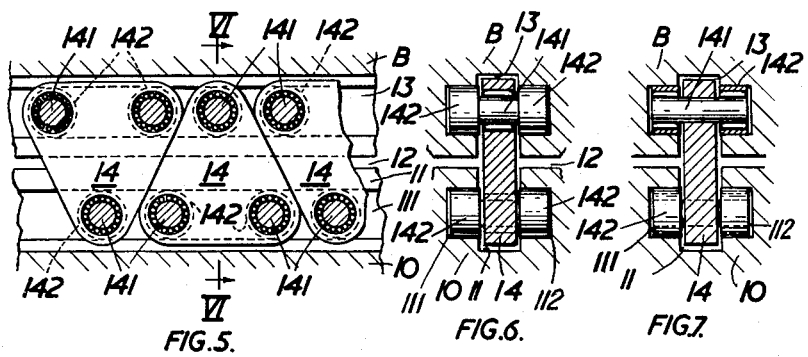
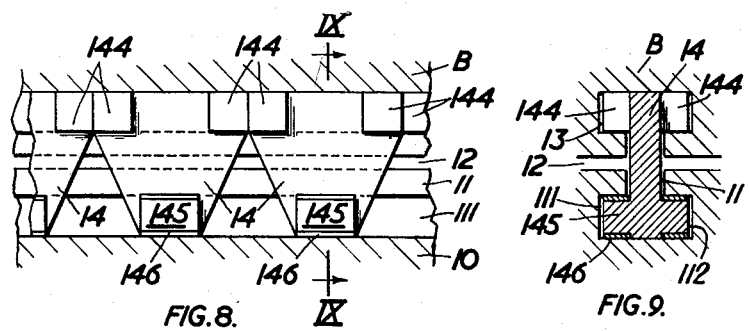
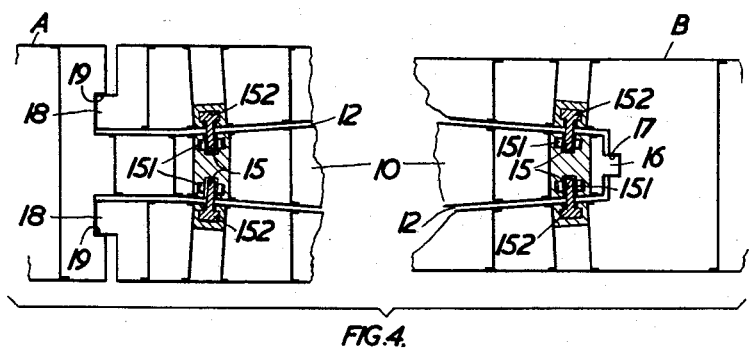
Inventor
Norman William Boorer
By Mass, Nolte & Nolte
Attorneys

United States Patent Office 3,023,983
Patented Mar. 6, 1962

3,023,983
AEROPLANE HAVING WINGS ADJUSTABLE IN SWEEP
Norman William Boorer, Crastock, Woking, England, assignor to Vickers-Armstrongs (Aircraft) Limited, London, England, a British company
Filed Nov. 18, 1960, Ser. No. 70,198
Claims priority, application Great Britain, Nov. 20, 1959
6 Claims. (Cl. 244—46)

The invention is concerned with aeroplanes having wings pivotally adjustable in sweep, an example of which is described in United States Patent No. 2,915,261, and its object is to provide for such aeroplanes an improved pivot bearing for the wings, which whilst affording provision for the movements of the wings in sweep, will also possess a high degree of resistance to deflection under flexural torsional loads on the wing. In addition, the bearing should be capable of accommodating changes in slope of the wing spar at the bearing, and of transmitting efficiently wing drag loads to the body.

A bearing in accordance with this invention comprises a tenon attached to or part of one of the pivoted objects (i.e. the wing or the body) and located between the opposed surfaces of a recess in the other object (i.e. the body or the wing), said opposed surfaces being connected to the adjacent surfaces of the tenon by means which permit relative angular movement between the objects about the sweep axis whilst providing a direct path or paths in the direction of said axis for the transmission of shear loads. Said connecting means may be constituted by tension links disposed in spaced angular relationship about the sweep axis, the ends of the links being engaged with the objects so as to prevent their relative displacement in the direction of said axis.

The said links may be fixedly anchored to one of the objects and provided with rollers running in rebated circular tracks co-axial with the pivot axis in the other object, or rollers and tracks may be provided in both surfaces of the tenon and in both of the jaw surfaces between which the latter is mounted.

In addition, the body structure and the wing structure may be furnished with inter-engaging tongues and grooves arranged co-axially with the sweep axis, to provide additional means of resisting flexural loads at the bearing.

The manner in which the invention may be carried into effect is hereinafter described in greater detail with reference to the accompanying drawings. In said drawings FIG. 1 is a diagrammatic plan of an aeroplane of the kind disclosed in U.S. Patent No. 2,915,261, for the wing-pivots of which the bearings of the present invention may be used. FIG. 2 is a fragmentary plan, drawn to a larger scale of one of the wing-pivots, and FIG. 3 is a section taken on the line III—III of FIG. 2. FIG. 4 is a fragmentary sectional view, similar to FIG. 3, of a modified embodiment.

FIG. 5 is a detail showing in elevation one form of the connecting links used to connect the pivoted parts, and FIG. 6 is a section thereof taken on the line VI—VI. FIG. 7 is a similar view to FIG. 6, showing an alternative form of roller mounting for the connecting links.

FIG. 8 is a view similar to FIG. 5, showing yet another arrangement of the connecting links, and FIG. 9 is a section thereof taken on the line IX—IX.

The aeroplane illustrated in FIG. 1 has a delta plan form body (or fore-wing) A which is provided at each end of the base with pivot-bearings for the respective wings (or main-wings) B, B. Attached to the structure of the body A at each pivot position in a tenon-like offset 10 which in plan resembles a disc projecting from the body and which is preferably of shallow conical form on its upper and lower sides, as at 101, 101, 102, 102. Said disc-like tenon 10 constitutes the pivot member and is hereinafter referred to as such.

In the upper and lower surfaces of the pivot member 10 are provided two or more radially spaced circular grooves 11 which are concentric with the sweep axis P—Q. Each such groove 11 is undercut at 111 and 112 to form a rebated track capable of receiving the anchorages of the links hereinafter described.

The wing structure in the region of the root is made with a recess 12 which is capable of receiving the double conical pivot member 10, with a certain degree of clearance between the opposing surfaces of the pivot member and the recess. Opposite each of the rebated track grooves 11 of the pivot member 10 there is provided a similar rebated track 13 in the wall of the wing root recess 12.

The connection between the pivot member 10 and the wing root structure is made by a series of spaced circumferentially disposed links engaging each of the opposing pairs of rebated tracks 11 and 13. Each such link may take the form of a stout plate 14 extending into the two track grooves and carrying at its extremities an axle or axles 141 mounting a roller or rollers 142 which are received in and cooperate with the rebated tracks 11, 13. The links are all in tension on both upper and under sides of the pivot member 10 and the latter is thus suspended in the recess 12 between the parts of the wing root structure so that the latter is capable of free rotation relatively to the body structure during movements of the wing in sweep.

The axles 141 may be rotatable in needle bearings 143 in the ends of the links 14, in which case the rollers 142 are fixed on said axles as shown in FIG. 6, or the axles 141 may be fixed in the ends of the links, the rollers 142 being rotatable on the ends of the axles, as shown in FIG. 7.

In another embodiment of the invention shown in FIG. 4, the multiple links are replaced by a single connecting member which takes the form of a cylinder 15 of which the rims at opposite ends extend into the annular grooves 11, 13 of the pivot member and of the wing structure, rollers 151 or slides 152 being mounted on said rims to engage the rebated parts of the grooves 11, 13.

Alternatively, the links 14 may be provided at one end with integral lugs 144 which are fixed in the rebated grooves of one of the pivoted parts, and at the other end with lugs 145 having bearing surfaces 146 which are arranged to slide in the rebated grooves of the other pivoted part. FIGS. 8 and 9 show such an arrangement, where the links are fixed in the grooves 13 of the wing structure and slidable in the grooves 11 of the member 10.

It will be recognized that it is an important advantage of this invention that it permits the use of a structural arrangement in which the transmitted loads are distributed over a number of structural members of the pivoted parts.

In order to provide additional means for resisting flexural loads at the bearing, the member 10 may be provided with a tongue 16 which engages slidably in a groove 17 in the wing structure. Similarly, the wing structure may have one or more tongues 18 which engage slidably in a groove or grooves 19 of the body structure, as shown in FIG. 4.

What I claim as my invention and desire to secure by Letters Patent is:

1. A wing pivot bearing for use with an airplane having a wing member, a body member, and means for pivoting said wing member about a sweep axis with respect to said body member, one of said members including a recess having opposed surfaces located therein, said bearing comprising a tenon attached to the other of said members, said tenon being positioned between said opposed surfaces, and means for connecting said tenon to said opposed surfaces, said connecting means comprising a plurality of tension links disposed in spaced angular relationship about said sweep axis, the ends of the links being engaged with said members to prevent their relative displacement in the direction of said axis.

2. A wing pivot bearing as claimed in claim 1, wherein the links are fixedly anchored to one of said members and arranged for movement about the sweep axis in relation to said other member.

3. A wing pivot bearing as claimed in claim 1, wherein said opposed surfaces are provided with grooves concentric with said sweep axis, said grooves being rebated at at least one side thereof, and wherein said links extend into oppositely disposed grooves and have anchorage means which engage the rebated parts of the grooves.

4. A wing pivot bearing as claimed in claim 3, wherein said anchorage means comprises rollers, rotatable on the links and extending laterally into the rebated parts of the grooves for rolling engagement therewith.

5. A wing pivot bearing as claimed in claim 3, wherein said anchorage means comprises lugs integral with the links and extending laterally into the rebated parts of the grooves for sliding engagement therewith.

6. A wing pivot bearing according to claim 1, wherein the body structure and wing structure are furnished with inter-engaging tongues and grooves concentric with the sweep axis to provide additional means of resisting flexural loads at the bearing.

References Cited in the file of this patent

UNITED STATES PATENTS

| | | |
|---|---|---|
| 1,586,979 | Dudgill | June 1, 1926 |
| 2,428,934 | Gille | Oct. 14, 1947 |
| 2,709,097 | Leary | May 24, 1955 |
| 2,922,601 | Wallis | Jan. 26, 1960 |